(12) United States Patent
Yuasa

(10) Patent No.: US 6,396,393 B2
(45) Date of Patent: May 28, 2002

(54) TRANSMITTING DEVICE, RECEIVING DEVICE, AND RECEIVING METHOD

(75) Inventor: Naoki Yuasa, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/748,551

(22) Filed: Dec. 26, 2000

(30) Foreign Application Priority Data

Dec. 28, 1999 (JP) .......................................... P11-374186
Nov. 14, 2000 (JP) .......................................... P12-352532

(51) Int. Cl.$^7$ ............................................ H04M 11/04
(52) U.S. Cl. ............................ 340/310.01; 340/310.02; 340/310.07
(58) Field of Search ............................... 340/3.51, 3.54, 340/309.4, 310.01, 310.02, 310.03, 310.05, 310.06, 310.07

(56) References Cited

U.S. PATENT DOCUMENTS

| 4,514,594 A | * | 4/1985 | Brown et al. | ........... 340/310.01 |
| 4,686,641 A | * | 8/1987 | Evans | .................... 340/310.01 |
| 5,802,467 A | * | 9/1998 | Salazar et al. | ......... 340/825.72 |
| 6,040,759 A | * | 3/2000 | Sanderson | ............. 340/310.01 |
| 6,157,292 A | * | 12/2000 | Piercy et al. | ........... 340/310.01 |

* cited by examiner

Primary Examiner—Van Trieu
(74) Attorney, Agent, or Firm—Jay H. Maioli

(57) ABSTRACT

In a power line transmission/reception system, when a receiving device receives data via a power line transmission network which transmits the same data with the same timing in parallel via a plurality of communication channels by means of superposition on AC power, the reception of the data is performed using a communication channel selected on the basis of mean channel usage periods measured for the respective communication channels, thereby assuring high-quality communication. Transmission data is generated by converting input data into packets and outputting the same packet repeatedly. The transmission data is transmitted via the plurality of communication channels at the same time by means of multiple carriers of different frequencies superimposed on the AC power, thereby assuring high-quality data communication.

16 Claims, 9 Drawing Sheets

| ROW | CHANNEL #1 | CHANNEL #2 | CHANNEL #3 |
|---|---|---|---|
| 1 | 5 | – | – |
| 2 | – | – | – |
| 3 | – | – | – |
| MEAN VALUE | 5 | – | – |

(B)

| ROW | CHANNEL #1 | CHANNEL #2 | CHANNEL #3 |
|---|---|---|---|
| 1 | 5 | 6 | – |
| 2 | – | – | – |
| 3 | – | – | – |
| MEAN VALUE | 5 | 6 | – |

(C)

| ROW | CHANNEL #1 | CHANNEL #2 | CHANNEL #3 |
|---|---|---|---|
| 1 | 5 | 6 | 4 |
| 2 | – | – | – |
| 3 | – | – | – |
| MEAN VALUE | 5 | 6 | 4 |

(D)

| ROW | CHANNEL #1 | CHANNEL #2 | CHANNEL #3 |
|---|---|---|---|
| 1 | 5 | 6 | 4 |
| 2 | – | 2 | – |
| 3 | – | – | – |
| MEAN VALUE | 5 | 4 | 4 |

(E)

| ROW | CHANNEL #1 | CHANNEL #2 | CHANNEL #3 |
|---|---|---|---|
| 1 | 5 | 6 | 4 |
| 2 | 5 | 2 | – |
| 3 | – | – | – |
| MEAN VALUE | 5 | 4 | 4 |

(F)

| ROW | CHANNEL #1 | CHANNEL #2 | CHANNEL #3 |
|---|---|---|---|
| 1 | 5 | 6 | 4 |
| 2 | 5 | 2 | – |
| 3 | 2 | – | – |
| MEAN VALUE | 4 | 4 | 4 |

(G)

| ROW | CHANNEL #1 | CHANNEL #2 | CHANNEL #3 |
|---|---|---|---|
| 1 | 5 | 6 | 4 |
| 2 | 5 | 2 | – |
| 3 | 2 | 2 | – |
| MEAN VALUE | 4 | 3.3 | 4 |

(H)

| ROW | CHANNEL #1 | CHANNEL #2 | CHANNEL #3 |
|---|---|---|---|
| 1 | 3 | 6 | 4 |
| 2 | 5 | 2 | – |
| 3 | 2 | 2 | – |
| MEAN VALUE | 3.3 | 3.3 | 4 |

…

TRANSMITTING DEVICE, RECEIVING DEVICE, AND RECEIVING METHOD

BACKGROUND OF THE INVENTION

1. Field of the Invention

The present invention relates to a receiving device and a receiving method for receiving data via a power line transmission network which transmits the same data with the same timing in parallel via a plurality of communication channels by means of superposition on AC power, in which a communication channel used to receive the data is selected on the basis of channel usage periods measured for the respective communication channels.

The present invention also relates to a transmitting method for transmitting data such that transmission data is generated by converting input data into packets and outputting each same packet repeatedly a plurality of times, and the transmission data is transmitted via a plurality of communication channels at the same time by means of superposition on AC power.

2. Description of the Related Art

In recent years, a power line transmission/reception system has been proposed and realized, for transmitting/receiving information such as an audio or video signal via a power line used to distribute commercial AC power to rooms in a home. An example of a power line transmission technique is disclosed in U.S. patent application Ser. No. 09/247,943 field on Feb. 11, 1999, which is incorporated herein by reference. In such a power line system, for example, a transmission signal is generated by modulating an audio signal or a video signal, and the resultant transmission signal is superimposed on commercial AC power distributed via a power line. In a receiving device, the transmission signal component superimposed on the commercial AC power is extracted and then demodulated thereby reproducing the original audio signal or video signal.

In general, not only a power line transmission/reception system but also other devices such as an electric lamp and various types of electronic devices are connected to a power line. In the power line transmission/reception systems, therefore, there is a rather high possibility that noise generated from electronic devices connected to the power line interferes with reception/reception.

One known technique of avoiding the above problem in the power line transmission/reception systems is to transmit the same information via a plurality of channels. In this technique, the same audio or video signal is modulated using a plurality of carriers having different frequencies and transmitted via different channels corresponding to the carrier frequencies. That is, the same information is transmitted from a transmitting device via a plurality of channels which are obtained in the above-described manner.

In a receiving device, a channel which provides a best reception, that is, which has a highest channel quality, is selected from the plurality of channels and is used for transmission of the information.

In this technique in which the same information is transmitted via the plurality of channels, even when a channel with a certain frequency is influenced by noise generated by another device, the receiving device can receive the information under a good condition by selecting a channel with another frequency which is not influenced by the noise.

The channel selection may be performed manually by a user. It is also known in the art to construct a receiving device such that the channel is automatically switched without needing a manual operation when degradation in the condition of the current channel is detected.

FIG. 1 illustrates an example of a manner in which the channel is switched in a receiving device having such an automatic channel switching capability.

In this example shown in FIG. 1, transmission is performed using three channels #1, #2, and #3.

When the channel #1 is used for reception, if a reception error is detected, that is, if the reception condition of the channel #1 becomes worse than an allowable level, the receiving device automatically switches the reception channel to the channel #2. If a reception error is detected during the reception using the channel #2, the reception channel is switched to the channel #3.

If a further reception error is detected during the reception using the channel #3, the reception channel is switched to channel #1 which was used first.

That is, the channel is switched in a predetermined fixed order, such as #1→#2→#3→#1 . . . , each time a reception error occurs.

However, the conventional channel switching technique described above with reference to FIG. 1 has the following problems.

When a channel is switched to another channel in response to detection of a reception error, it is not assured that a good reception condition is obtained in the new channel. If the new channel does not provide good reception, the channel is further switched to another channel until a good reception condition is obtained. Thus, in some cases, it takes a long time to reach a good channel. That is, a communication error or a bad communication condition can often occur over a rather long period of time.

Herein, let us assume that a channel which provides the best reception quality is now being used and all the other channels are under steady bad reception conditions.

The current channel having the best reception quality can temporarily fall into a bad reception state due to sudden noise. However, in such a case, the channel should not be switched to another channel, and the current channel should be maintained.

However, in the channel switching technique shown in FIG. 1, detection of a reception error always causes switching from the current channel to a predetermined next channel, and thus, in this specific example, the current channel which provides the best reception is switched to the next channel which is steadily in the bad state and further to another bad channel. Thus, it takes a long time to return to the best channel.

As described above, the conventional technique has the problem that the simple channel switching in the fixed order does not allow the channel to be properly switched depending upon the actual reception conditions of the respective channels.

SUMMARY OF THE INVENTION

According to an aspect of the present invention, there is provided a receiving device for receiving data via a power line transmission network which transmits the same data with the same timing in parallel via a plurality of communication channels by means of superposition on AC power, the receiving device comprising: receiving means for extracting data superimposed on AC power from a particular channel of the network thereby receiving said data; timer means for measuring a channel usage period during which a communication channel is used by the receiving means to receive data; storage means for storing the channel usage period measured by the timer means, for each communication channel; calculation means for calculating the mean channel usage period of each communication channel from the channel usage periods stored in the storage means; and control means which controls the storage means so as to store the channel usage period measured by said timer means for each communication channel, and which controls the receiving means so as to select a communication channel used to receive data on the basis of the mean channel usage periods of the respective communication channels calculated by the calculation means and so as to receive the data using the selected channel.

According to another aspect of the present invention, there is provided a transmitting device for transmitting input data via a power line transmission network which has a plurality of communication channels and which transmits data by means of superimposing data upon AC power, the transmitting device comprising: compression means for compressing the input data; packet conversion means for converting the data compressed by the compression means into packets each having a predetermined length of data;. transmitting means for transmitting the data converted into packets by the packet conversion means via the plurality of communication channels at the same time.

According to still another aspect of the present invention, there is provided a receiving method for receiving data via a power line transmission network which transmits the same data with the same timing in parallel via a plurality of communication channels by means of superposition on AC power, the receiving method comprising the steps of: extracting data superimposed on AC power from a particular channel of the network thereby receiving the data, and measuring a channel usage period during which a communication channel is used to receive the data; when a communication failure is detected during the reception of the data, calculating the mean channel usage period of the particular channel from the channel usage period measured during the current receiving operation and from the channel usage periods of the particular channel measured in the past; selecting a communication channel to be used, on the basis of the calculated mean channel usage period and the mean channel usage periods calculated for the other respective communication channels.

BRIEF DESCRIPTION OF THE DRAWINGS

FIG. 7 is a schematic diagram illustrating changes in the content of a history table, corresponding to the automatic channel switching operation shown in FIG. 6;

DESCRIPTION OF THE PREFERRED EMBODIMENTS

The preferred embodiments of the present invention are described below in the following order:

1. System Configuration
1.1 General Configuration
1.2 Server
1.3 Client
2. Channel Switching
2.1 Specific Examples
2.2 Process 1. System Configuration 1.1 General Configuration A receiving device according to a present embodiment serves as a client in a transmission/reception system for transmitting/receiving, via a power line, an audio or video signal output from an AV (audio visual) device. The configuration of the transmission/reception system of the present embodiment is described first.

Figure 1:
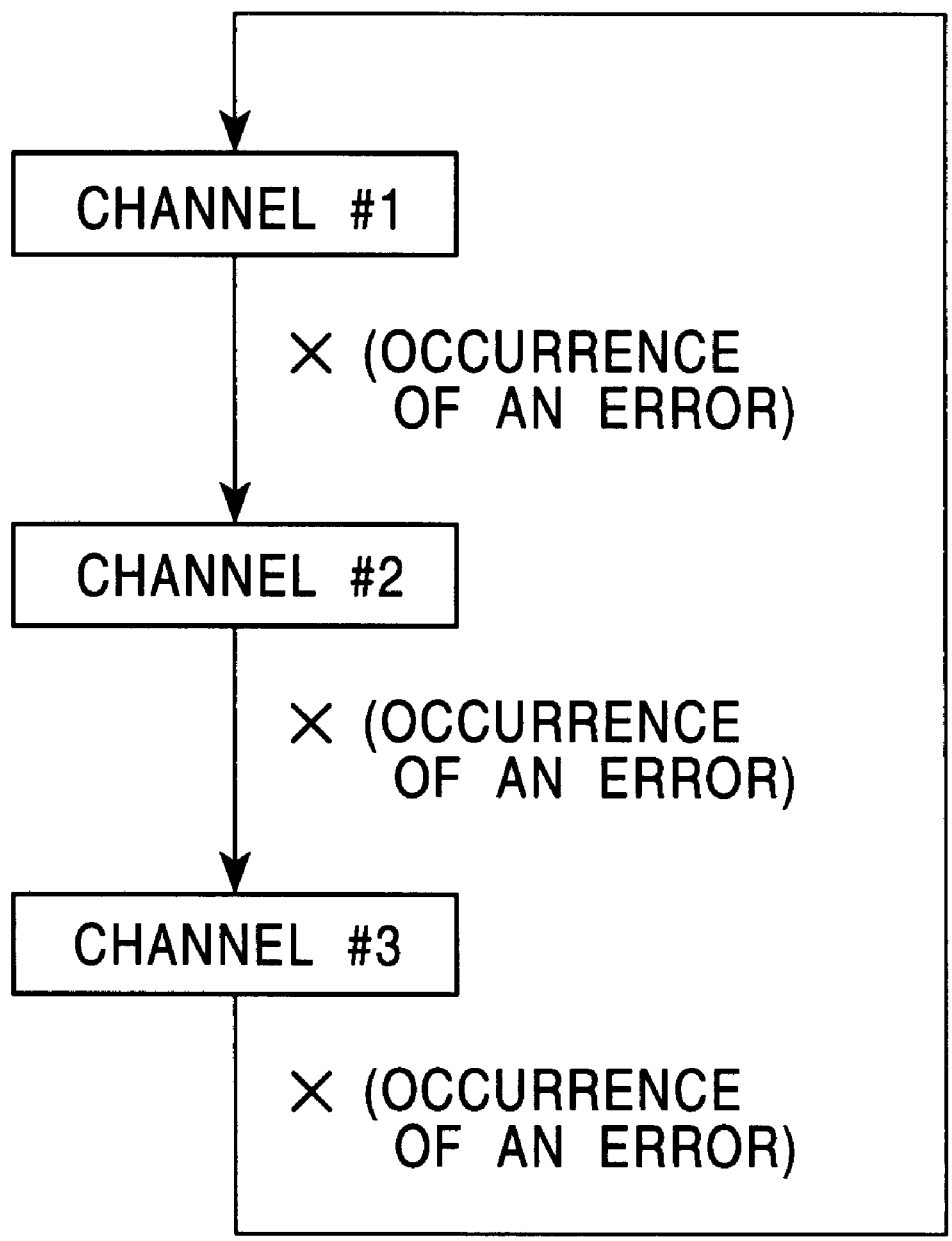
FIG. 1 is a schematic diagram illustrating an automatic channel switching operation according to a conventional technique.
Figure 2:
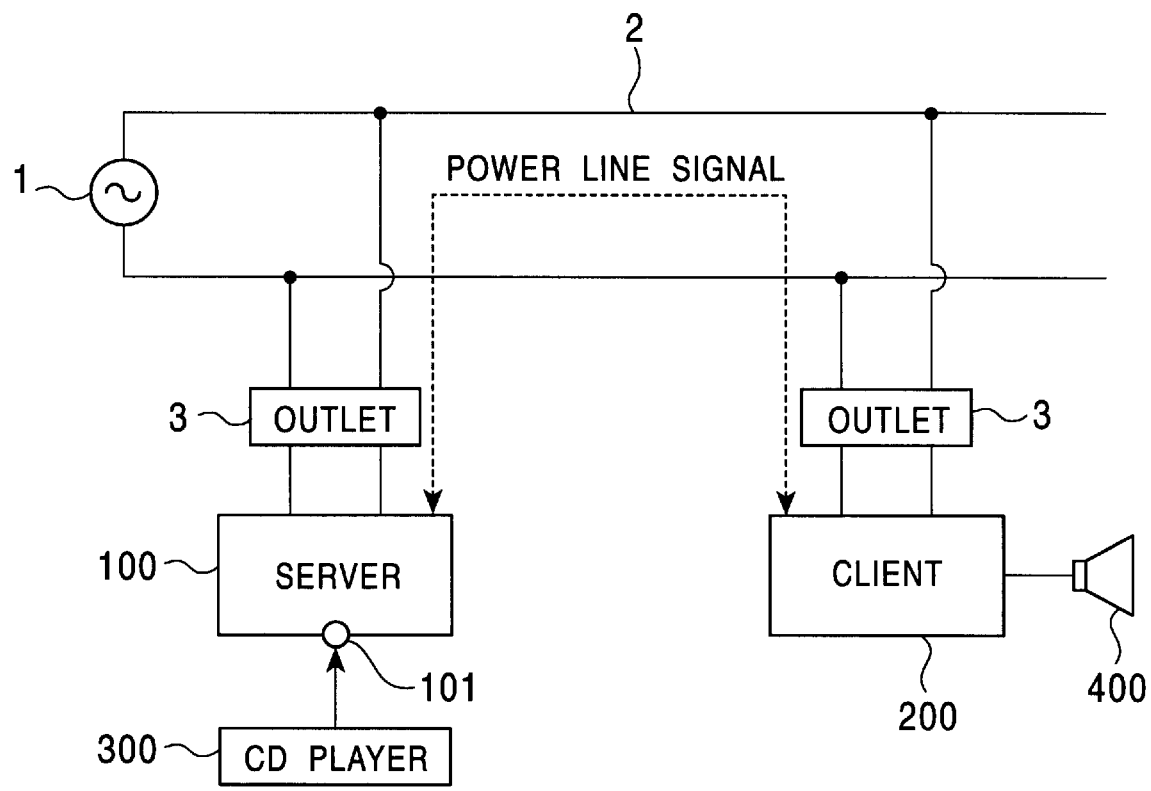
FIG. 2 is a schematic diagram illustrating an example of the general configuration of a transmitting and receiving system according to an embodiment of the present invention.

FIG. 2 illustrates an example of the general configuration of the system of the present embodiment.

As shown in FIG. 2, the system of the present embodiment includes at least two electronic devices, that is, a server 100 serving as a transmitting device, and a client 200 serving as a receiving device. A CD (Compact Disc (TM)) player 300 serving as an AV device is connected to the server 100. An audio signal recorded on a CD is read by the CD player 300 and input to the server 100.

The server 100 is connected to a power line 2 via an outlet 3 so that commercial AC power 1 required for the operation of the server 100 is supplied to the server 100. The server 100 performs signal processing such as modulation upon the audio signal received from the CD player 300, as described later, and superimposes the resultant signal upon the power line thereby transmitting the signal to the client 200.

The client 200 is also connected to the power line 2 via an outlet 3 so that commercial AC power 1 required for the operation of the client 200 is supplied to the client 200.

The client 200 is capable of receiving and demodulating the audio signal which is transmitted from the server 100 via the power line 2. The resultant audio signal is output from the client 200 and supplied to a speaker 400 connected to the client 200. Thus, the audio signal recorded on the CD is transmitted from the server 100 and a corresponding audio sound is output from the speaker 400.

When such a system is used in a home, the server 100 and the client 200 may be placed in different rooms. For example, an audio set serving as the server 100 is placed in a living room, while the client 200 may be placed in a bedroom so that the audio sound played back by the audio set serving as the server can be listened to via the client 200 in the bedroom.

1.2 Server

Figure 3:
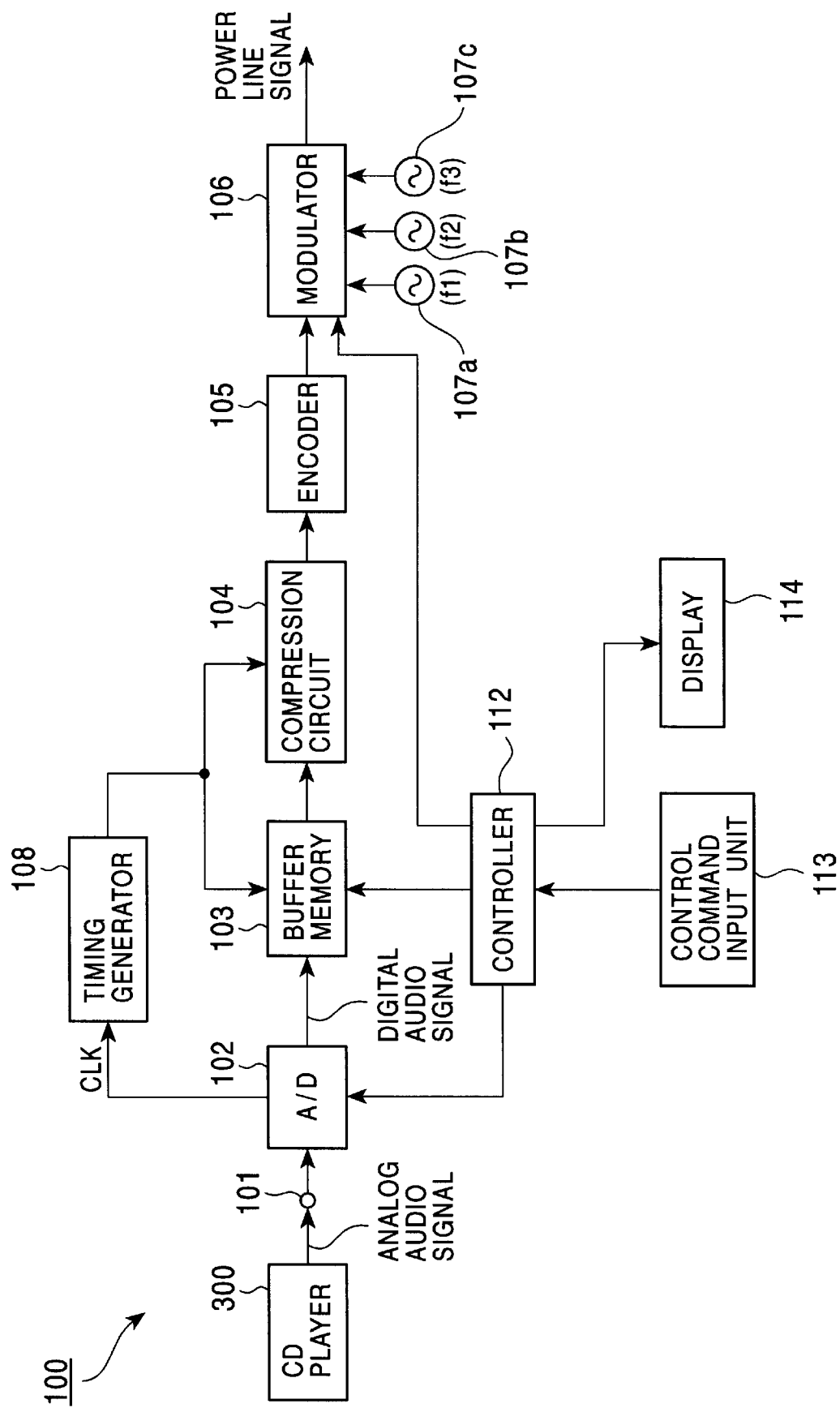
FIG. 3 is a block diagram illustrating an example of the internal configuration of a server.

FIG. 3 illustrates an example of the internal configuration of the server 100.

In this example, the server 100 has an external audio input terminal 101 which is designed, for the purpose of general versatility, to accept an analog audio signal. The analog audio signal output terminal of the CD player 300 is connected to the external audio input terminal 101 so that the audio signal output from the CD player 300 is input to the server 100.

The analog audio signal, which is read from the CD and input via the external audio input terminal 101, is first applied to an A/D converter 102.

A digital audio signal (digital audio data) is output from the A/D converter 102 and applied to a buffer memory 103. The A/D converter 102 also outputs a clock CLK synchronized with the digital audio data converted from the analog audio signal. The clock CLK is input to a timing generator 108. On the basis of the clock CLK, the timing generator 108 generates a clock used to control the timing of the operation of the buffer memory 103 and a compression circuit 104, which will be described later. The generated clock is supplied to the buffer memory 103 and the compression circuit 104.

The buffer memory 103 temporarily stores the input digital audio data. The digital audio data is then read from the buffer memory 103 and supplied to the compression circuit 104. The compression circuit 104 compresses the received audio data according to a predetermined scheme and outputs the resultant compressed data to an encoder 105. In accordance with a predetermined scheme, the encoder 105 adds an error detection code and a synchronization pattern to the compressed audio data and encodes the audio data into a form suitable for transmission over a power line.

Figure 5:
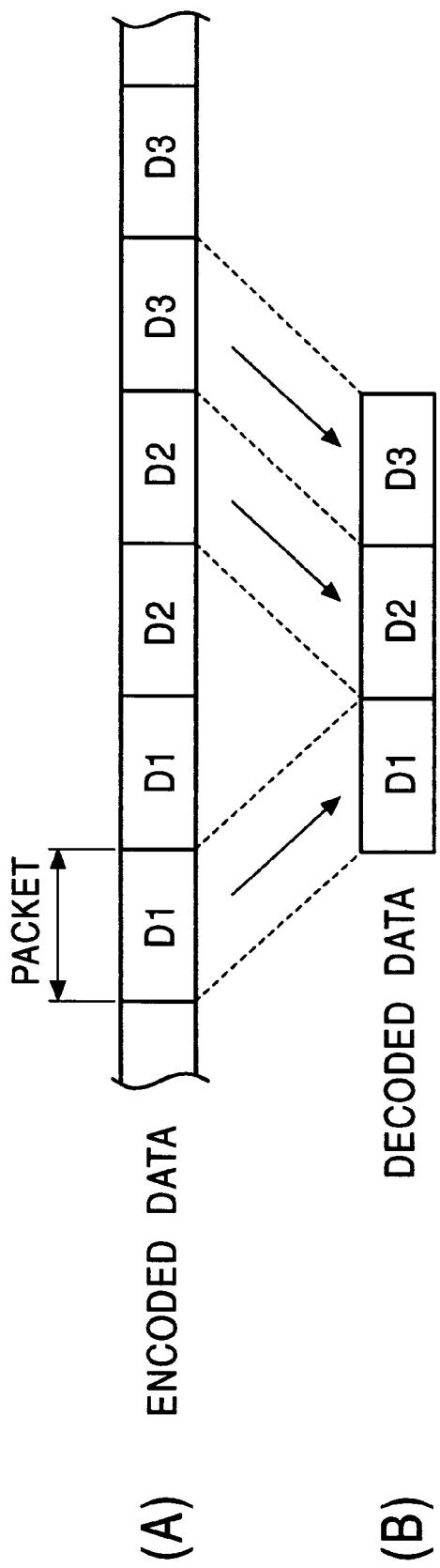
FIG. 5 is a schematic diagram illustrating the format of encoded data generated by an encoding process performed by the server and also illustrating the format of decoded data generated by a decoding process performed by the client.

An feature of the present embodiment is in that the encoder 105 performs rearrangement of the audio data in terms of time as shown in FIG. 5A.

More specifically, as shown in FIG. 5A, the audio data is divided into a plurality of packets, and the packets are arranged in the order D1→D1→D2→D2→D3→5D and so on. Packet data D1, D2, and D3 each include a fixed length of audio data corresponding to a predetermined length of playback time. If the packets are concatenated in the order D1→D2→D3, the obtained audio data becomes correctly continuous in terms of time.

The encoder 105 transmits each same packet of the audio data twice successively such that that a succession of two packets having the same content is transmitted.

The reason which the encoder 105 can transmit each same packet of the audio data twice successively is that the compression of the audio data performed by the encoder 105 results in a reduction in the time required for transmission. The number of packets including the same content is determined depending upon the compression ratio of the compression process performed by the encoder 105. For example, if the data is compressed by the encoder 105 to a data size one-fifth the original data size, the compressed data can be transmitted, via each channel, with a transmission efficiency improved by a factor of five. This means that each channel is not used for ⅘ of unit time. Therefore, the same packet of the compressed data can be transmitted successively a plurality of times, as long as the number of repetition times that each same packet is transmitted is equal to or less than the reciprocal of the compression ratio, that is, equal to or less than 5 in this specific example. That is, the number of repetition times that the same packet is transmitted is determined depending upon the compression ratio of the data compressed by the encoder 105.

When the client 200 receives the data arranged as shown in FIG. 5A, the client 200 performs decoding by selecting one of the two successive packets including the same content. The selected packets are then concatenated as shown in FIG. 5B.

In this specific example, data is transmitted in the order D1→D→D2→D2→D3→D3 as shown in FIG. 5A. A packet D1 located at the first position of the succession of packets D1 and D1 is first selected. A packet D2 at the second position of the succession of packets D2 and D2 is then selected. Furthermore, a packet D3 at the first position of the succession of packets D3 and D3 is selected. The selected packets D1, D2, and D3 are then combined in this order so as to obtain a series of packets placed at correct positions, in terms of time, corresponding to the original audio data.

The determination as to which of the two successive packets having the same content should be selected is made depending upon the reception condition under which the packets are received. More specifically, for example, the, selection is made depending upon the quality of the received signal. If the first packet of two successive packets having the same content is better in signal quality, the first packet is employed. Conversely,;if the second packet is better, the second packet is employed.

The above-described manner in which the data is transmitted and received makes it possible that data is maintained in a correct time series even when the reception channel is switched during the normal operation, as will be described in detail later.

A modulator 106 modulates the encoded data output from the encoder 105.

In the present embodiment, three carrier generators 107*a*, 107*b*, and 107*c* are connected to the modulator 106. The carrier generators 107*a*, 107*b*, and 107*c* generates carries with different frequencies f1, f2, and f3.

The modulator 106 modulates the carries generated by these carrier generators 107*a*, 107*b*, and 107*c*, in accordance with the encoded data output from the encoder 105.

Because the modulating signal is a digital signal, FSK (Frequency Shift Keying), which is one of digital modulation schemes, is employed as the modulation method for the modulation performed by the modulator 106. The three data modulated according to the FSK method using carrier frequencies f1, f2, and f3 are transmitted in a multiplexed fashion.

That is, in the present embodiment, the same data is transmitted via three channels. More specifically, the same data encoded as shown in FIG. 5A is transmitted at the same time via the three channels.

The modulation performed by the modulator 106 may be performed according to a method other than the FSK. For example, PSK (Phase Shift Keying, spread spectrum modulation, or other digital modulation techniques may also be employed. Furthermore, the modulation signal may be an analog signal. In this case, frequency modulation or amplitude modulation may be employed.

The data signal modulated by the modulator 106 is superimposed on the power line 2 such that the data signal is transmitted as a power line signal.

A controller 112, including a microcomputer, ROM, and RAM, controls the operation of various functional circuits of the server.

A control command input unit 113 includes various command buttons for inputting various commands to the server 100. A command output from the control command input unit 113 is applied to the controller 112. In response to the received command, the controller 112 performs a control operation.

A display 114 displays, under the control the controller 112, information corresponding to the current operation status.

1.3 Client

Figure 4:
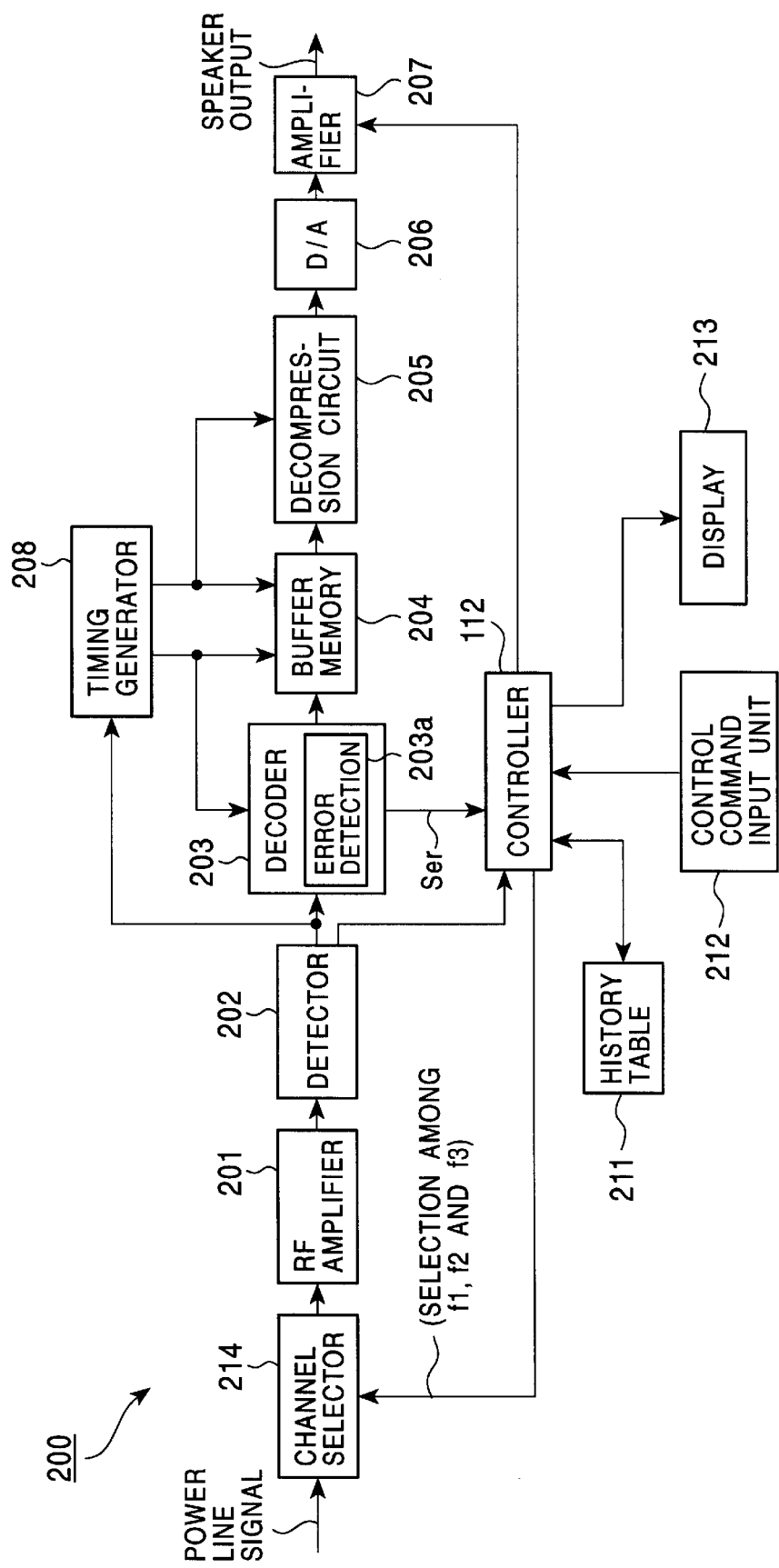
FIG. 4 is a block diagram illustrating an example of the internal configuration of a client.

FIG. 4 illustrates an example of the internal configuration of the client 200.

The power line signal received via the power line 2 is applied to a channel selector 214. In the present embodiment, as described above, the same audio data is received in parallel via the thee channels. The channel selector 214 selects, under the control of a controller 210, one of the three channels.

For the above purpose, the channel selector 214 includes a bandpass filter (not shown) whose passband can be switched among the thee carrier frequencies f1, f2, and f3. Under the control of the controller 210, the passband of the bandpass filter is switched so as to pass only one of carrier frequencies f1, f2, and f3 thereby selecting a desired channel.

The received signal of the channel selected by the channel selector 214 is then applied to an RF amplifier 201. The RF amplifier 201 extracts a signal component superimposed on the power signal. The resultant signal is then detected by a detector 202 and thus a data signal is extracted. In the present embodiment, the data signal transmitted from the server 100 to the client is audio data. However, in practice, various command signals and control information are also transmitted. The audio data is applied to a decoder 203, while the command signal is applied to the controller 210.

The audio data output from the detector is also a supplied to a timing generator 208. The timing generator 208 detects, for example, the synchronization pattern added to the audio data and generates a clock on the basis of the detected synchronization pattern. The generated clock is output to a decoder 203, a buffer memory 204, and a decompression circuit 205, which will be described later, thereby controlling the timing of the operation of the decoder 203 the buffer memory 204, and the decompression circuit 205.

The audio data supplied to the decoder 203 is first subjected to error detection performed by an error detection circuit 203a. FSK-decoding process is then performed. The decoded data is temporarily stored in the buffer memory 204 and then output to the decompression circuit 205. The decoded data output from the decoder has the form described above with reference to FIG. 5B. That is, in the case of audio data, compressed audio data in the form of a correct time series is obtained.

If the error rate detected during the error detection process performed by the error detection circuit 203a is greater than a predetermined level, the error detection circuit 203a determines that an error occurs and outputs an error notification signal Ser indicating the occurrence of the error to the controller 210. In response to the error notification signal Ser, the controller 210 performs an automatic channel switching operation as will be described in detail later.

The data supplied to the decompression circuit 205 is decompressed, and the resultant data is applied to a D/A converter 206.

The D/A converter 206 converts the applied audio data into an analog audio signal and outputs the resultant signal to an amplifier 207. The amplifier 207 amplifies the received audio signal and outputs the amplified audio signal to a speaker.

The controller 210 includes, for example, a microcomputer, a ROM, and a RAM, and controls the operation of various parts of the client.

In the present embodiment, there is provided a history table 211 used by the controller 210. As will be described in detail later, channel quality information representing the history about the reception condition of channels is recorded in the history table 211. In response to switching of the reception channel during the normal operation, the controller 210 updates the channel quality information described in the history table 211. When an error occurs, the controller 210 selects a channel on the basis of the content of the history table 211 and switched the reception channel to the selected channel.

The history table 211 may be stored in a particular memory area of the RAM in the controller 210.

A control command input unit 213 includes various command buttons for inputting various commands to the client 200. A display 213 displays, under the control the controller 210, information corresponding to the current operation status.

2. Channel Switching
2.1 Specific Examples

In the transmission/reception system according to the present embodiment, as described above, information is transmitted using a plurality of channels, for example, three channels. The receiving device serving as the client 200 selects one of the plurality of channels and receives the information via the selected channel. By selecting a channel having high channel quality from the plurality of channels, it becomes possible for the receiving device to substantially always output a high-quality audio or video signal.

In the present embodiment, the receiving device serving as the client 200 is constructed so as to automatically switch the channel depending upon the reception condition of the respective channels thereby making it possible to maintain a better reception condition than can be achieved by the conventional technique in which the channel is simply switched in the fixed order.

Figure 6:
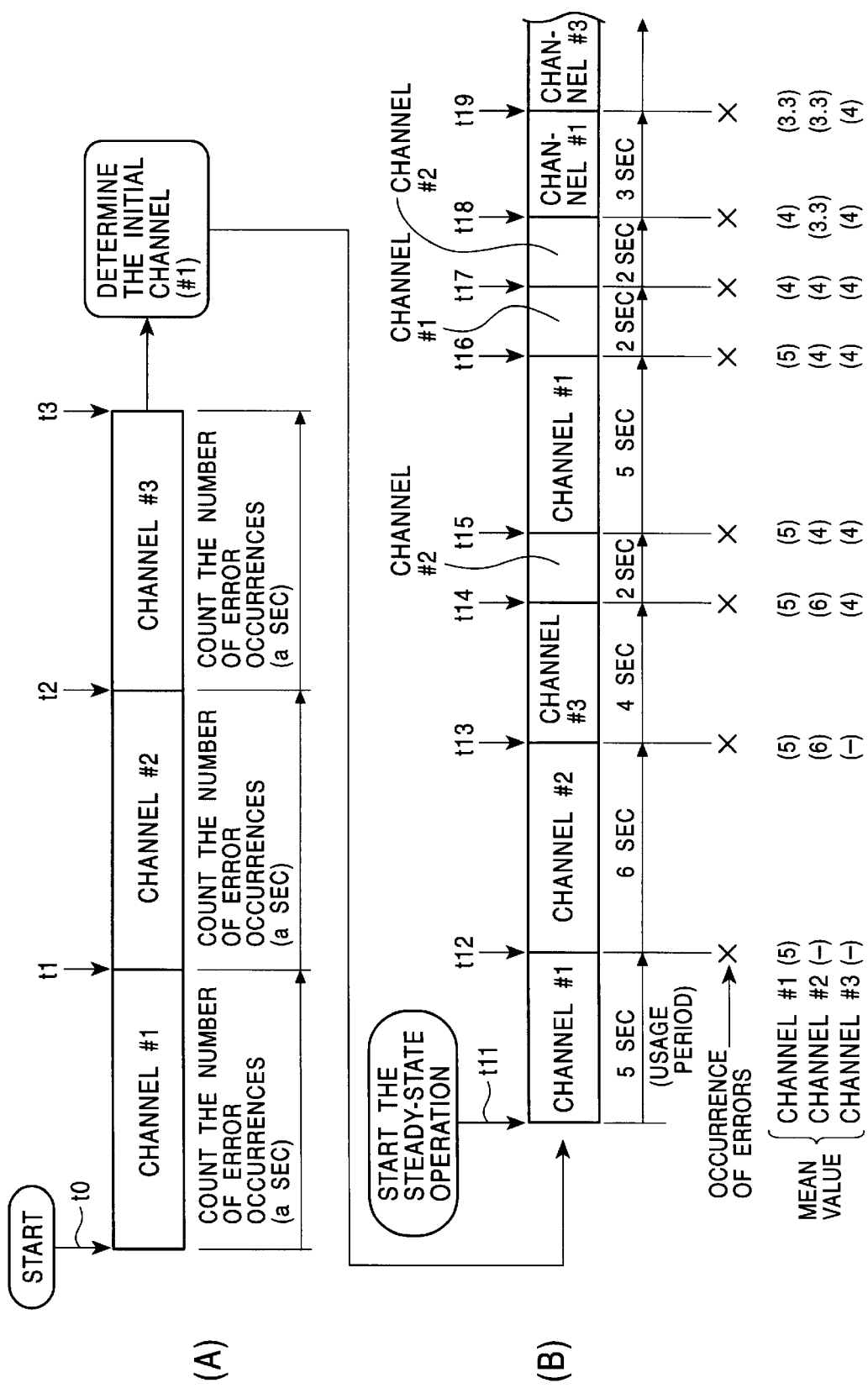
FIGS. 6A and 6B are time charts illustrating a specific example of the channel switching operation according to the embodiment of the present invention.

A FIGS. 6A and 6B are time charts illustrating a specific example of the channel switching operation performed by the client 200.

In the present embodiment, the automatic channel switching operation consists of an operation for determining an initial channel which is first selected when the client 200 is started up and a normal operation performed after the determination of the initial channel.

FIG. 6A illustrates the operation for determining the initial channel. In the following description, the respective three channels are distinguished by channel number and represented such as channel #1, channel #2, and channel #3.

At a time t0 in FIG. 6A, the electric power of the client 200 is turned on and thus the operation of the client 200 is started. The client 200 first selects, for example, the channel #1 for a predetermined period of time, for example a sec, and counts the number of errors which occur during the period in which the channel #1 is selected. The decision as to whether an error has occurred is made by the controller 210 on the basis of the error notification signal Ser received from the error detection circuit 203a described earlier with reference to FIG. 4.

At a time t1 after the passage of time of a sec since the selection of the channel #1 at time t0, the channel #2 is selected for a period having the same length of time, a sec, from t1 to t2, and the number of errors which occur during that period is counted.

Similarly, at a time t2, the channel #3 is selected for a period having the same length of time, a sec, from t2 to t3, and the number of errors which occur during that period is counted.

Thus, at the time t3, information about the number of errors for the same length of time, a sec, is obtained for the respective channels #1, #2, and #3. In the present embodiment, the number of occurrences of errors is compared among the channels, and a channel having the smallest number of occurrences of errors is employed as the initial channel.

The employment of the channel having the smallest number of occurrences of errors is equivalent to the selection of a channel which is currently best in terms of the reception condition, that is, the selection of a channel having the highest channel quality.

The selection of the initial channel according to the present embodiment provides the following advantages.

In practice, noise generated by a device connected to a power line generally has frequency components limited in a particular fixed frequency band, depending upon the type of the device. In such a case, only a fixed channel is influenced and degraded by the noise.

Therefore, once a channel having the best initial channel quality is employed as the initial channel, it is not necessary, in many cases, to switch the channel to another channel during the operation after the determination of the initial channel.

In the present embodiment, during the normal operation, the channel is automatically switched depending upon the condition in terms of the error occurrence, as will be described later. If the normal operation is started using a predetermined channel without performing the initial channel selection described above, it takes a long time to reach a high-quality channel, and a high-quality reception is impossible until reaching the high-quality channel. In contrast, if the initial channel is selected in the manner described above with reference to FIG. 6A, it is possible to start the normal operation under the good reception condition.

Even in the normal operation after selecting the initial channel, there is a possibility that the reception condition of the channel, that is, the channel quality changes due to a change in the environment or a change in the operation condition of the device itself or due to other factors. In the present embodiment, in order to handle such a change, the channel is switched during the normal operation, as will be described in detail later.

In the channel switching during the normal operation, the channel to be employed next is determined on the basis of the content of the history table 211.

An example of a change in the content of the history table 211 is shown in FIGS. 7A to 7H. An example of the normal operation is described below with reference to FIG. 6B and FIGS. 7A to 7H.

Herein, let us assume that the channel #1 is selected as the initial channel in the operation described above with reference to FIG. 6A.

When the normal operation is started at a time t11 in FIG. 6B, the initial channel #1 is also employed as the channel for reception. The controller starts the measurement of the length of the channel usage period during which the currently selected channel (current channel) is continuously used.

Immediately after the start of the normal operation at time t11 in FIG. 6B, no history information is described in the history table 211.

Let us assume that an error occurs at a time t12 when 5 sec has elapsed from time t11. When the first error occurs during the normal operation, the current channel is switched to another channel.

When the error occurs, the measured channel usage period is described in the history table 211 and stored in a memory. The content of the history table 211 at time t2 is shown in FIG. 7A. The mapping structure of the history table 211 is described below.

In the history table 211, rows 1, 2, and 3 are assigned to the channel #1, #2, and #3, as shown in FIG. 7A. The length of the channel usage period is described row by row, in the order of row number, each time the same channel is employed. In the fourth row, the mean channel usage period calculated from the values currently described in the first to third rows for each channel is described. That is, in the history table 211, the channel usage periods for the last three usages of each channel and the mean value thereof are described as the history information representing the history of the reception condition or the channel quality.

In the example shown in FIG. 6B, at time t12, the channel usage period for the channel #1 employed as the initial channel is measured as 5 sec. Thus, the value of 5 is described in the first row in the column corresponding to the channel #1, as shown in FIG. 7A. At this point of time, no valid values are described in the second and third row for the channel #1. In FIG. 7A, the absence of the valid value is represented by a symbol "−". The same representation is used also in FIGS. 7B to 7H. At this point of time, the mean channel usage period of the channel #1 is also 5 sec, and thus the value of 5 is described in the fourth row. At this point of time, the channels #2 and #3 have not been used at all, and thus no valid values are described in the history table 211 for the channel #2 and #3.

The channel to be employed for the operation after time t12 cannot be determined from the content of the history table 211 because the channels other than channel #1 have not been used and no information about the channels #2 and #3 is described in the history table 211. For the above reason, at this point of time, the channel is switched to channel #2 having a channel number immediately following that of the current channel #1.

Herein, let us assume that at time t13 after the passage of time of 6 sec from t12, an error occurs in the channel #2 selected at time t12. In this case, in the history table 211, a value of 6 is described in the first row for the channel #2 as shown in FIG. 7B, to indicate that the measured channel usage period of the channel #2 is 6 sec. and a value corresponding to 6 sec is described as the mean value for the channel #2.

At this point of time, the channel #3 having a channel number following that of the channel #2 remains unused. Thus, the channel is switched to the channel #3. Let us further assume that an error occurs at time t14 after the passage of time of 4 sec from t13 at which the channel #3 was selected. In response to the occurrence of the error, a value of 4 is described in the first row for the channel #3 in the history table 211 as shown in FIG. 7C, to indicate that the measured channel usage period of the channel #3 is 4 sec, and a value corresponding to 4 sec is described as the mean value for the channel #3.

At this point of time t14, information about the mean channel usage period of all channels becomes available from the history table 211, as shown in FIG. 7C.

Therefore, in the operation after this point of time, the channel to be employed for the next usage is determined on the basis of the mean channel usage periods described in the history table 211, as described below.

A greater value of the mean channel usage period indicates a better reception condition or better channel quality. Conversely, a small value of the mean channel usage period indicates that the channel quality has been bad. Therefore, in the present embodiment, a channel having the greatest mean channel usage period in the history table 211 is selected for the next usage.

In the example shown in FIG. 7C, the history table 211 indicates that the channel #2 has the greatest mean channel usage period at this point of time. Thus, the channel #2 is employed in the operation after time t14.

In FIG. 6B, an error occurs at time t15 after the passage of time of 2 sec from t14 at which the channel #2 was selected. In response to the occurrence of the error at time t15, the content of the history table 211 is updated as shown in FIG. 7D. That is, in addition to the channel usage periods of the respective channels described in the first row, a value of 2 corresponding to the channel usage period of 2 sec from t14 to t15 for the channel #2 is described in the second row.

At this point of time, the channel usage periods are described in both first and second rows for the channel #2. Thus, the mean value calculated from the values of these two channel usage periods is described in the fourth row. More specifically, the mean value is calculated as (6+2)/2=4, and thus the mean value for the channel #2 is replaced with 4.

In FIG. 7D, the history table 211 indicates that, among all channels, the channel #1 has the largest mean channel usage period. Thus, the channel #1 is employed in the following operation after time t15.

In FIG. 6B, an error occurs at time t16 after the passage of time of 5 sec from t15 at which the channel #1 was selected.

In response to the occurrence of the error at time t16, a value of 5 indicating the channel usage period of 5 sec is described in the second row for the channel #1. The mean channel usage period of the channel #1 is calculated as (5+5)/2=5, and thus a value of 5 is described in the fourth row for the channel #1.

The history table 211 shown in FIG. 7E indicates that the channel #1 has the greatest mean channel usage period at this point of time.

That is, the content of the history table shown in FIG. 7E indicates that the channel #1, which was used in the operation before time t16, is still best in channel quality. Therefore, the channel #1 is maintained without being switched to another channel. Thus, in FIG. 6B, the channel #1 is further used in the operation after time t16.

In the present embodiment, as described above, when an error occurs in the currently used channel, if the history information indicates that the current channel is still best in channel quality, the use of the current channel is maintained. The reason is described in further detail below.

For example, when an error due to momentary noise occurs in the current channel which have had a good reception condition for a long continuous period of time, further maintaining the use of the current channel without selecting another channel having a worse reception condition can result in achievement in a better reception condition. Thus, the above-described operation according to the present embodiment can provide a better reception condition.

Let us assume that, at time 17 after the passage of time of 2 sec since t16, an error occurs in the channel #1 which was not switched to another channel at time t16 but has been further used.

In response to the occurrence of the error, a value of 2 indicating the channel usage period of 2 sec is described min the history table 211, in the third row in the column corresponding to the channel #1, as shown in FIG. 7F. The mean channel usage period is calculated as (5+5+2)/3=4, and thus the value of the mean channel usage period in the history table 211 is replaced with a value of 4.

At this pint of time, the content of the history table indicates, as can be seen from FIG. 7F, that all channels have the same mean channel usage period, that is, 4 sec. In this case, there are a plurality of channels having the maximum mean channel usage period, and the current channel is one of such channels.

In this case, the current channel is switched to another channel. When there is only one channel, in addition to the current channel, that has the maximum mean channel usage period, the current channel is switched to that channel. However, when there are two or more such channels in addition to the current channel, the current channel is switched to one of such channels in accordance with a predetermined rule. For example, the switching may be performed in the ascending order of channel numbers.

Thus, in this specific example, the channel #1 which has been used till time t17 is switched to the channel #2.

In the example shown in FIG. 6B, an error occurs in the channel #2 at time t18 after the passage of time of 2 sec from t17 at which the use of the channel #2 was started.

In response to the occurrence of the error, a value corresponding to the channel usage period of 2 sec is described in the third row in the column corresponding to the channel #2, as shown in FIG. 7G. The mean channel usage period of the channel #2 is calculated as (6+2+2)/3≈3.3, and thus the values of the mean channel usage period of the channel #2 is replaced with 3.3.

At this point of time, as shown in FIG. 7G, the history table 211 indicates that the channels #1 and #3 both have a mean channel usage period of 4 and the channel #2 has a mean channel usage period of 3.3.

In this case, the channel #2 is switched to the channel #1 or #3. In the present embodiment, a channel having a smaller channel number, that is, the channel #1 is selected. Thus, the channel #1 is used in the operation after time t18. Note that the channel #3 may be selected instead of the channel #1.

In the example shown in FIG. 6B, an error occurs at time t19 after the passage of time of 3 sec from t18 at which the channel #1 was selected. In response to the occurrence of the error, the history table 211 is updated as shown in FIG. 7H.

At time t18, the values of the channel usage period of the channel #1 in the past three usages were already described in the first to third rows of the history table 211. In such a case, the value is described again from the first row, and the value for the past usage is replaced with a new value each time the channel is used.

In the example shown in FIG 7H, the value of the channel usage period in the first row in the column corresponding to the channel #1 is replaced with a new value of 3 sec. In response, the mean channel usage period of the channel #1 is recalculated. In this specific example, the mean channel usage period is calculated as (3+5+2)/3=10/3≈3.3, and thus the mean channel usage period of the channel #1 is replaced with 3.3.

At this point of time, the content of the history table 211 shown in FIG. 7H indicates that the channel #3 has the greatest mean channel usage period. As a result, the channel #3 is selected for the use after time t19.

In the present embodiment, the channel switching is automatically performed in the manner described above.

In the present embodiment, as described above, the automatic channel switching is performed on the basis of the values of channel usage periods which indicate the channel quality. This makes it possible to switch the channel on the basis of the actual channel quality of the respective channels so as to obtain a better reception condition than can be achieved by the conventional technique in which the channel is simply switched in a predetermined order.

Furthermore, in the present embodiment, the values of the channel usage periods in a predetermined number of usages (three usages in the example shown in FIG. 7) in the past are stored thereby making it possible to select a still better channel on the basis of the mean channel usage values indicating the channel quality of the respective channels.

Although in the specific example described above, the values of the channel usage periods in the last three usages for each channel are stored in the history table, and the mean value of the channel usage periods in the last three usages is calculated, the number of values used to calculate the mean channel usage period is not limited to three.

However, if the number of samples of the channel usage periods is too small, a momentary reduction in the channel usage period due to a rare error can cause the mean channel usage period to deviate from a value representing the real channel quality.

Conversely, if the number of samples of the channel usage periods is too large, when the channel quality of the respective channels changes with the passage of time, it takes a long time to obtain a mean channel usage period which corresponds correctly to the real channel quality.

Therefore, the number of samples of channel usage periods should be properly determined taking into account the factors described above.

2.2 Process

The channel switching operation according to the present embodiment described above with reference to FIGS. 6A and 6B and FIGS. 7A to 7H is described in further detail with reference to the flow charts shown in FIGS. 8 and 9. The operation shown in FIGS. 8 and 9 is performed by the controller 210 of the client 200.

Figure 8:
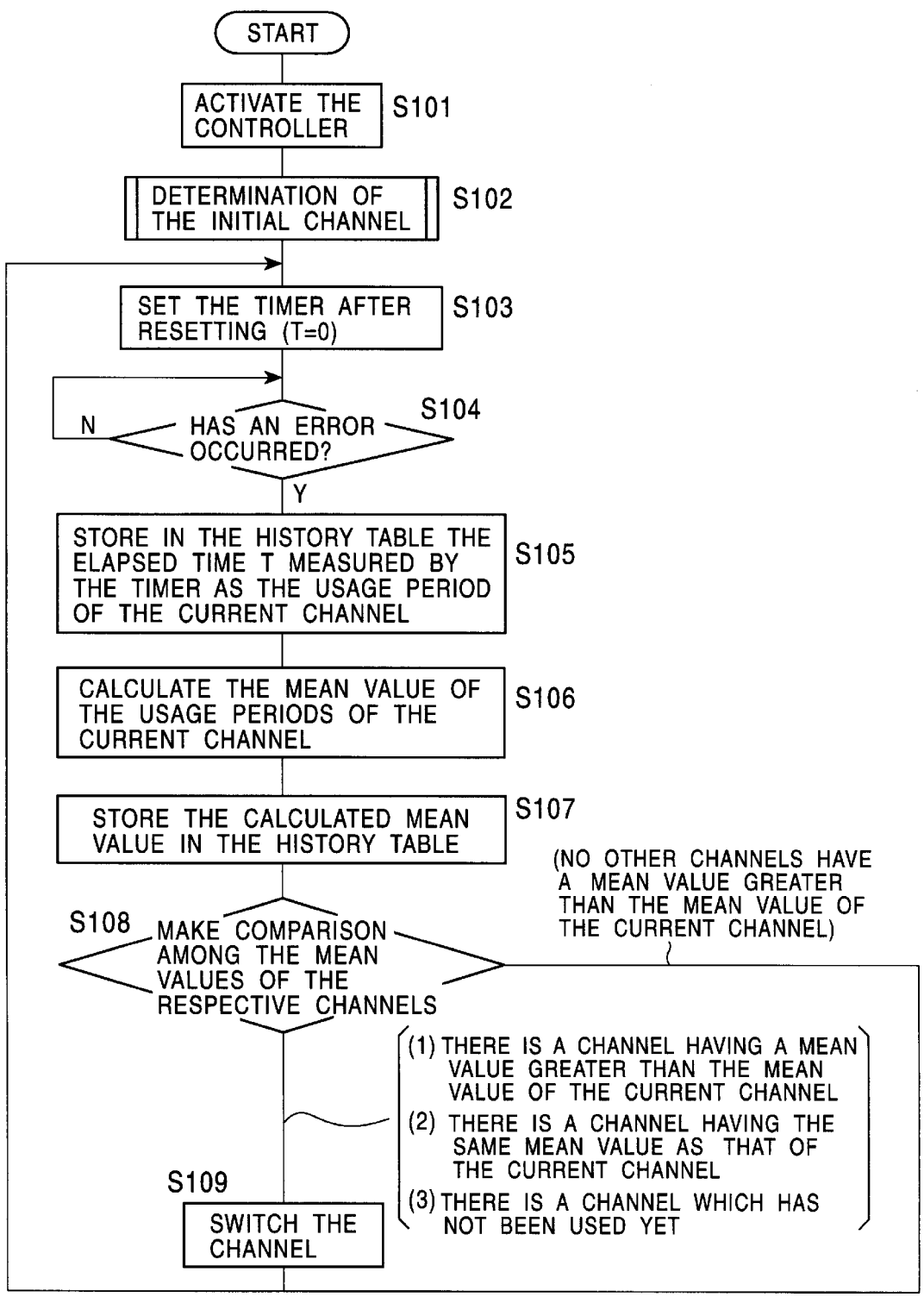
FIG. 8 is a flow chart illustrating the automatic channel switching operation according to the embodiment of the present invention.
Figure 9:
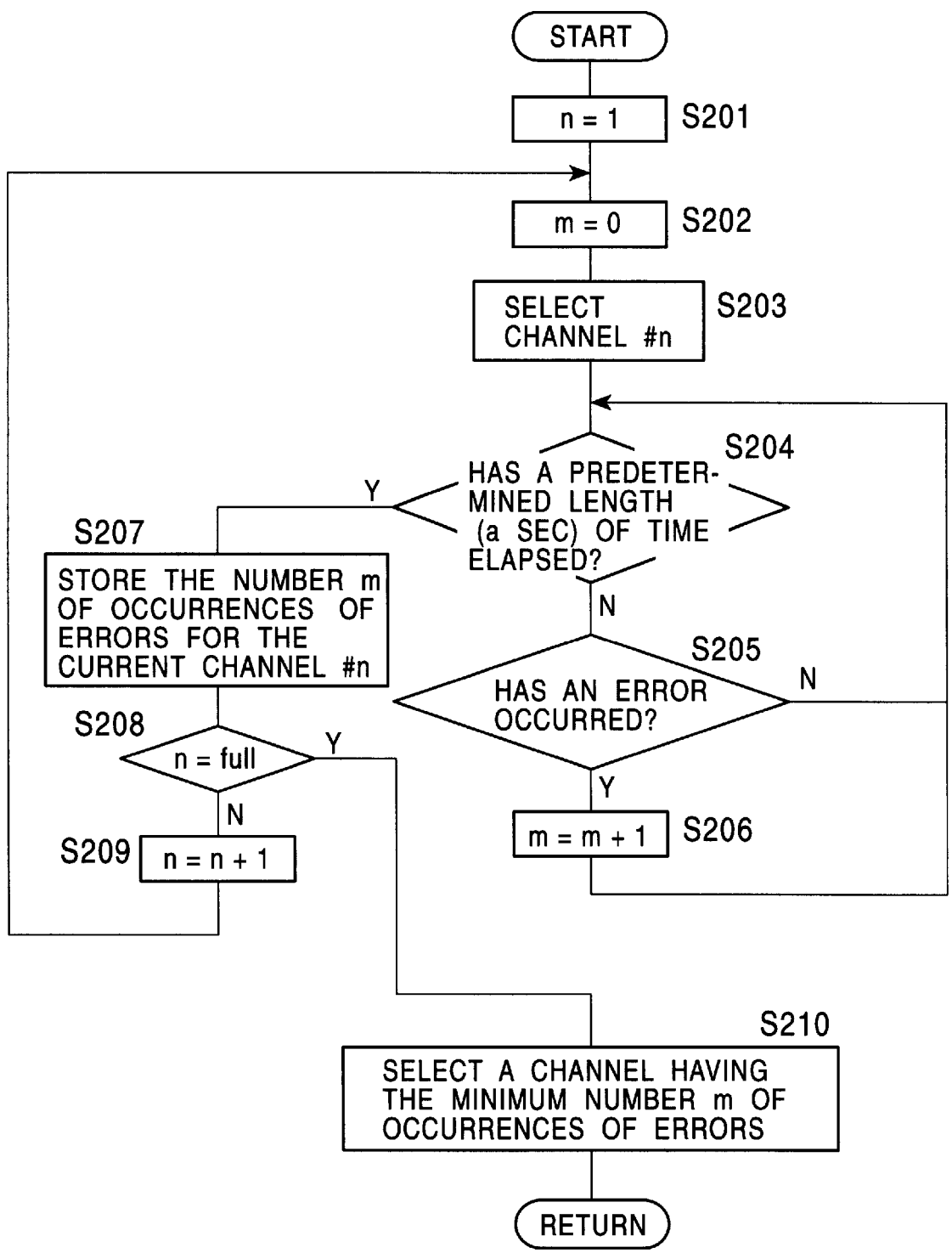
FIG. 9 is a flow chart illustrating the operation of determining an initial channel.

If the power of the client 200 is turned on, the operation of the controller 210 is started in step S101 in FIG. 8. In the next step S102, the initial channel is determined in the manner described above with reference to FIG. 6A.

The process of step 102 for determining the initial channel is described in further detail below with reference to FIG. 9.

In step S201, a variable n representing the channel number is set such that n=1. In the next step S202, a variable m representing the number of occurrences of errors is set such that m=0.

In step S203,;the channel selector 214 is controlled such that a channel #n corresponding to the current value of the variable n is selected.

In the next step S204, it is determined whether a predetermined length of time (a sec) defined as the initial channel usage period for each channel has elapsed. If the decision in step S204 is negative, the process goes to step S205.

In step S205, it is determined whether an error has occurred on the basis of an error notification signal Ser output from the error detection circuit 203a in the decoder 203.

If it is determined in step S205 that there is no error, the process returns to step S204. However, if an error is detected in step S205, the process goes to step S206. In step S206, the variable m is incremented such that m=m+1, and then the process returns to step S204.

In steps S204 to S206 the number of occurrences of errors during the predetermined channel usage period with a length of a sec is counted for each channel.

If it is determined in step S204 that the predetermined length of time has elapsed, the process goes to step S207.

In step S207, the current value of the variable m is stored as the number of occurrences of errors for the currently used channel #n. More specifically, the number of occurrences of errors, m, is stored in a predetermined. memory area of an internal RAM. In the next step S208, it is determined whether the current value of the variable n is equal to the maximum allowable value. In this specific embodiment, it is determined whether n=3. If the decision in step S208 is negative, there is a channel which is to be evaluated in terms of the number of occurrences of errors, and thus the process goes to step S209. In step S209, the variable n is incremented such that n=n+1, and then the process returns to step S202.

On the other hand, if the decision in step S208 is affirmative, the process goes to step S210.

In step S210, the value of m representing the number of occurrences of errors, which has been measured and stored in the internal RAM, is compared among the channels #1 to #3, and the channel selector 214 is controlled such that a channel having the smallest value is selected. Thus, in step S210, the channel is switched to the initial channel.

After determining the initial channel in the process shown in FIG. 9, the process goes to step S103 in FIG. 8 to start a normal receiving operation in which the channel is switched as required. That is, the process, an example of which is shown in FIG. 6B, is started.

In step S103, a timer disposed in the controller 210 is reset, that is, the timer time T is reset to the initial value such that T=0. The timer is then started.

The process then waits in step S104 until an error occurs. If an error is detected in step S104, the process goes to step S105.

In step S105, the measured timer time T is employed as the channel usage period of the current channel and is written in a particular field of the history table 211 wherein the field is determined in the manner described above with reference to FIG. 7.

In the next step S106, the mean channel usage period of the current channel is calculated from the values of channel usage periods described in the history table 211. In the next step S107, the calculated mean value is written in the history table 211, in the field corresponding to the current channel.

In step S108, the current values of the mean channel usage periods of the respective channels #1 to #3, described in the history table 211, are compared with each other. If the comparison indicates that there is no channel having a mean channel usage period greater than that of the current channel, that is, if only the current channel has the maximum mean channel usage period, the process returns to step 103. In this case, the currently used channel is further used without being switched to another channel, as is the case at time t1 in FIG. 6B.

On the other hand, the process goes to step S109 when the comparison in step S108 indicates one of the following results: 1) there is another channel, other than the current channel, which has the maximum mean channel usage period; 2) the current channel and another channel have the same maximum mean channel usage period; and 3) there is a channel which has not been used yet. In this case, the current channel is switched to another channel depending upon which of results 1) to 3) is obtained in the comparison in step S108, as described below.

If the comparison result is 1), the current channel is switched to another channel having the maximum mean channel usage period. When there are a plurality of channels, other than the current channel, which have the maximum mean channel usage periods, one of such channels is selected in accordance with a predetermined rule.

In the case of 2), if there is only one channel, other than the current channel, which has the same maximum channel usage period as that of the current channel, that one channel is selected. When there are three or more channels are used, as is the case in the present embodiment, there is a possibility that there are a plurality of channels which have the same maximum channel usage period as that of the current channel. Also in this case, one of such channels is selected in accordance with a predetermined rule.

In the case of 3), one of channels which are detected as having not been used yet is selected in accordance with a predetermined rule.

After completion of step S109, the process returns to step S103.

Steps S103 to S109 are performed repeatedly during the normal operation thereby automatically switching the channel in response to an occurrence of error, as described earlier with reference to FIG. 6B.

Although not described above, information indicating which channel is currently selected may be displayed on the display 114 so as to notify the user of the current status in terms of the usage of the channel.

In the present invention, the automatic channel switching operation is not limited to that described above with reference to the specific embodiment. For example, only the process of determining and selecting the initial channel described earlier with reference to FIG. 6A may be performed, and the automatic channel switching operation described earlier with reference to FIG. 6B may not be performed. In usual power lines, because channels having bad quality are generally fixed, the execution of only the process of selecting the initial channel can provide great benefits.

The details of the automatic channel switching operation according to the present embodiment may be modified as required. For example, when an error is detected, if there are a plurality of channels, including the current channel, which have the same maximum mean channel usage period, the current channel may be further used without being switched to another channel, or one of such the plurality of channels may be selected in a random fashion and the current channel may be switched to the selected channel.

The details of the server and the client may also be modified. For example, the server may have a receiving capability and the client may have a transmitting capability so that various kinds of data such as control data may be transmitted between the server and the client.

In the example shown in FIG. 4, an amplifier is disposed in the inside of the client. Alternatively, an output terminal for outputting a source signal in an analog or digital form may be provided on the client and another external amplifier or an audio device may be coupled to the client via the output terminal so that an audio/video signal is output from a speaker or a monitor device connected to the external amplifier or the audio device.

Furthermore, the source signal transmitted from the server is not limited to a signal output from a CD player. For example, a signal output from another type of digital audio device such as an MD (Mini Disc) player or a DAT (Digital Audio Taperecorder) may also be transmitted. A signal output from a conventional cassette tape recorder or a tuner may also be transmitted. The type of the signal transmitted from the server is not limited to the audio signal, but another signal such as a video signal may also be transmitted. In this case, various types of AV devices such as a VTR (Video Tape Recorder), a DVD player for reproducing a video signal recorded on a DVD, and a television set may be connected to the server.

In the present invention, as described above, the same information is transmitted via a plurality of channels (a plurality of different carriers) over a power line, and a receiving device obtains channel quality information representing the channel quality of the respective channels and selects a channel having the best channel quality on the basis of the channel quality information.

This capability of preferentially selecting the best channel depending upon the current reception condition prevents a long-time reception failure which often occurs in the conventional technique. In other words, the present invention assures a good reception condition over a long period of time.

The channel quality information is represented on the basis of a period from a time when a channel is selected to a time when degradation in the channel quality (error) occurs. The representation of the channel quality information on the basis such a period of time makes it possible to easily obtain the channel quality information by simple processing without having to perform complicated calculations.

By storing the channel quality information in a memory (storage means, memory area), it becomes possible to properly switch, when an error occurs, the channel to a better channel on the basis of the history of the channel quality information.

Using the channel quality information stored in the memory, it is possible to obtain information about the change in channel quality for each channel. On the basis of the information about the change in the channel quality, it is possible to properly select the channel to which the current channel is to be switched. This makes it possible to select the channel in a more adequate fashion.

The channel quality information includes information about the period from a time at which a channel is selected to a time at which degradation in channel quality due to an error occurs, and the mean period is calculated from the values of the periods stored in the memory.

The change in the channel quality can be evaluated from the above mean period. On the basis of the mean periods of the respective channels, a channel to which the current channel is to be switched is selected. Thus, it is possible to precisely select a proper channel by simply calculating the mean period.

On the basis of information about the channel quality of each channel in the past, which is obtained from the channel quality information of each channel stored in the memory, it is determined whether the current channel should be further used without being switched to another channel or the current channel should switched to another channel.

In the case where a momentary and rare error occurs in the current channel which is better in channel quality than the other channels, the use of the current channel can be maintained without being switched to another channel which worse in channel quality. Also in this sense, the channel can be selected in a more adequate fashion, and a better reception condition can be steadily obtained.

In the present invention, the starting-up operation is performed such that channels are selected one by one in fixed intervals, and the channel quality of each channel is evaluated. On the basis of the obtained channel quality information, a channel having the best channel quality is selected as an initial channel.

The selection of the initial channel in the above-described manner makes it unnecessary to select a best channel after starting the receiving operation and makes it possible to start the receiving operation using the channel having the best channel quality.

In practical power line transmission/reception systems, noise generally has frequency components limited in a particular fixed frequency band. Therefore, if the initial channel has good channel quality, it is seldom necessary to switch the channel to another channel during the following operation. That is, good reception can be obtained for a long period of time immediately after starting the operation.

What is claimed is:

1. A receiving device for receiving data via a power line transmission network which transmits the same data with the same timing in parallel via a plurality of communication channels by means of superposition on AC power, said receiving device comprising:

receiving means for extracting data superimposed on AC power from a particular channel of said network thereby receiving said data;

timer means for measuring a channel usage period during which a communication channel is used by said receiving means to receive data;

storage means for storing the channel usage period measured by said timer means, for each communication channel;

calculation means for calculating the mean channel usage period of each communication channel from the channel usage periods stored in said storage means; and control means which controls said storage means so as to store the channel usage period measured by said timer means for each communication channel, and which controls said receiving means so as to select a communication channel used to receive data on the basis of the mean channel usage periods of the respective communication channels calculated by said calculation means and so as to receive said data using the selected channel.

2. A receiving device according to claim 1, wherein said selection of the communication channel is performed when a communication failure occurs in a communication channel being used.

3. A receiving device according to claim 2, wherein it is determined that said communication failure occurs when an error rate is detected as being equal to or greater than a predetermined level.

4. A receiving device according to claim 1, wherein:

the transmission of said data via the network is performed in such a manner that said data is first converted into packets each having a predetermined amount of data, and then each same packet is transmitted a plurality of times; and said receiving device selects one packet from each succession of the same packets and uses the selected packets.

5. A receiving device according to claim 1, further comprising storage control means for controlling said storage means so as to store the mean channel usage period measured by said calculation means for each communication channel.

6. A receiving device according to claim 1, wherein said selection of the communication channel is performed such that the mean channel usage periods stored in said storage means are evaluated and a communication channel having a greatest mean channel usage period is selected.

7. A receiving device according to claim 1, wherein:

said data transmitted via the network is compressed data;

said receiving device further comprises decoding mean for decompressing said compressed data; and said receiving device decompresses, using said decoding means, the compressed data received by said receiving means.

8. A receiving device according to claim 1, wherein before starting the reception of data via the network, said receiving device measures the channel usage period from a time at which a communication channel is selected to a time at which a communication failure occurs for each communication channel, and said receiving device selects a communication channel having a greatest measured channel usage period.

9. A receiving device according to claim 1, wherein said data transmitted via the network is continuous in terms of time.

10. A transmitting device for transmitting input data via a power line transmission network over a number of communication channels and in which data is superimposed upon AC power, said transmitting device comprising:

an A/D converter for converting analog input data into digital data;

compression means for compressing said digital data and producing compressed data;

packet conversion means for converting the compressed data into a plurality of packets each having a predetermined length of the compressed data and for repeatedly outputting each packet a number of times in succession based on a compression ratio of said compression means; and transmitting means for modulating the data converted into packets and output by said packet conversion means by a plurality of different carrier frequencies equal in number to the number of channels and transmitting the same modulated data over the number of communication channels simultaneously.

11. A transmitting device according to claim 10, wherein said plurality of packets having the same content are transmitted successively from said transmitting means.

12. A receiving method for receiving data via a power line transmission network which transmits the same data with the same timing in parallel via a plurality of communication channels by means of superposition on AC power, said receiving method comprising the steps of:

extracting data superimposed on AC power from a particular channel of said network thereby receiving said data, and measuring a channel usage period during which a communication channel is used to receive said data;

when a communication failure is detected during the reception of said data, calculating the mean channel usage period of said particular channel from the channel usage period measured during the current receiving operation and from the channel usage periods of said particular channel measured in the past; and selecting a communication channel to be used, on the basis of the calculated mean channel usage period and the mean channel usage periods calculated for the other respective communication channels.

13. A receiving method according to claim 12, wherein it is determined that said communication failure occurs when an error rate is detected as being equal to or greater than a predetermined level.

14. A receiving method according to claim 12, wherein the transmission of said data via the network is performed in such a manner that said data is first converted into packets each having a predetermined amount of data, and then each packet is transmitted a plurality of times;

said receiving method further comprising the step of selecting one packet from each succession of the same packets.

15. A receiving method according to claim 12, wherein in said communication channel selection step, a communication channel having a greatest calculated mean channel usage period is selected.

16. A receiving method according to claim 12, further comprising the steps of:

before starting the reception of data via the network, measuring the channel usage period from a time at which a communication channel is selected to a time at which a communication failure occurs for each communication channel; and selecting a communication channel having a greatest channel usage period of the channel usage periods measured for the respective communication channels.

* * * * *